United States Patent
Hardouin

(10) Patent No.: US 6,311,078 B1
(45) Date of Patent: Oct. 30, 2001

(54) AUTOMATIC SHUTOFF FOR WIRELESS ENDPOINTS IN MOTION

(75) Inventor: Larry J. Hardouin, Westminster, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/196,542

(22) Filed: Nov. 20, 1998

(51) Int. Cl.[7] ........................................ H04B 1/38
(52) U.S. Cl. ................ 455/567; 455/401; 455/412; 455/517; 455/238.1; 340/441
(58) Field of Search ........................ 455/440, 441, 455/456, 457, 458, 425, 517, 567, 238.1, 412, 413, 401, 422, 575, 67.1; 340/441

(56) References Cited

U.S. PATENT DOCUMENTS

| | | | |
|---|---|---|---|
| 5,404,391 | * | 4/1995 | Wavroch et al. ................ 455/567 |
| 5,574,971 | * | 11/1996 | Aihara ................................ 455/441 |
| 5,845,219 | * | 12/1998 | Henriksson ....................... 455/567 |
| 5,990,676 | * | 11/1999 | Hori .................................. 455/441 |
| 6,014,566 | * | 1/2000 | Owada ............................... 455/441 |
| 6,038,444 | * | 3/2000 | Schipper et al. .................. 455/421 |
| 6,108,532 | * | 8/2000 | Matsuda et al. ................ 455/238.1 |
| 6,124,810 | * | 9/2000 | Segal et al. ....................... 340/441 |

* cited by examiner

*Primary Examiner*—Nay Maung
*Assistant Examiner*—Quochien B. Vuong
(74) *Attorney, Agent, or Firm*—John C. Moran

(57) ABSTRACT

A wireless telephone does not generate an alerting signal if the speed at which the wireless telephone is moving exceeds a predefined speed when an incoming call is received. If an alerting signal is not generated for an incoming call, the wireless telephone transmits a message back to the calling party informing them that they have contacted the wireless telephone and may leave either a voice or data message. The caller can then either leave a voice message or touch tone in the caller's telephone number. Further, the wireless telephone can inhibit the origination of calls from the wireless telephone if the speed of the wireless telephone exceeds the predefined speed. In addition, if the speed has not been equal or less than the predefined speed for a predefined amount of time, call originations and alerting signals are blocked.

3 Claims, 3 Drawing Sheets

AUTOMATIC SHUTOFF FOR WIRELESS ENDPOINTS IN MOTION

TECHNICAL FIELD

This invention relates generally to wireless switching systems and, in particular, to control of a wireless telephone.

BACKGROUND OF THE INVENTION

Studies have indicated that talking on a wireless telephone while driving increases the risk of an accident. Part of the increased risk is attributed to drivers being distracted by a wireless telephone ringing. This risk can be abated by the users turning their wireless telephones off when they enter a vehicle and turning it on when they exit or come to a complete stop. However, few users perform these actions every time they enter or exit a vehicle. Certain foreign countries make it illegal to utilize a wireless telephone at anytime while driving an automobile. However, a user could easily forget about this prohibition and originate or receive a call while driving an automobile.

SUMMARY OF THE INVENTION

The foregoing problems are solved, and a technical advance is achieved by an apparatus and method in which a wireless telephone does not generate an alerting signal for an incoming call if the speed at which the wireless telephone is moving exceeds a predefined speed. Advantageously, if an alerting signal is not generated for an incoming call, the wireless telephone transmits an audio message back to the calling party informing them that they have contacted the wireless telephone and may leave either a voice or data message. Further, the wireless telephone must have been below the predefined speed for a predefined amount of time before the alerting signal will be generated. The caller can then either leave a voice message or touch tone in the caller's telephone number. Further, the wireless telephone can inhibit the origination of calls from the wireless telephone if the speed of the wireless telephone exceeds the predefined speed. In addition, if the speed has not been equal or less than the predefined speed for a predefined amount of time, call originations are blocked.

These and other features and advantages of the present invention will become more apparent from the following description of an illustrative embodiment of the invention considered together with the drawing.

DETAILED DESCRIPTION

Figure 1:
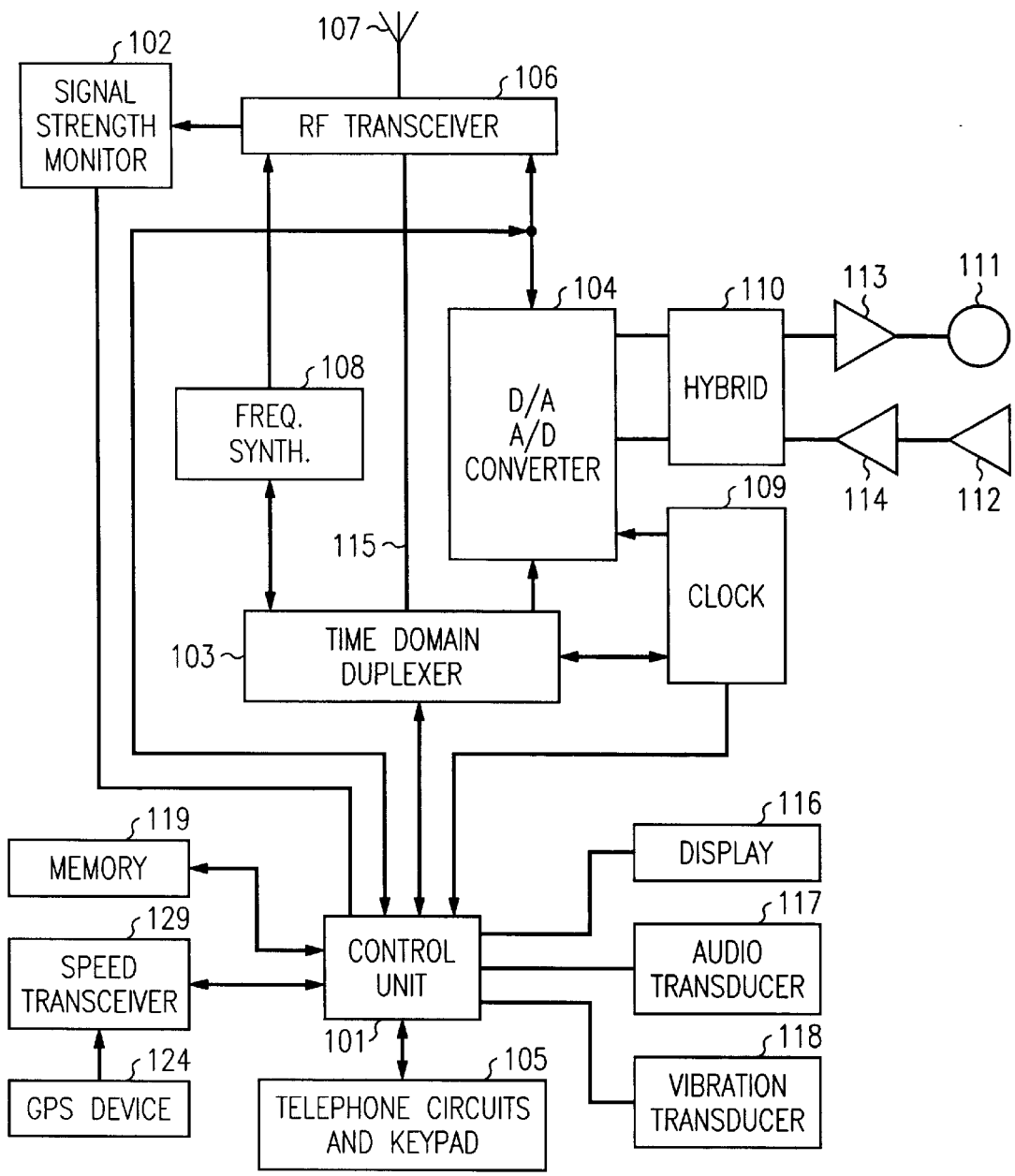
FIG. 1 illustrates, in block diagram form, a wireless telephone.

FIG. 1 illustrates in block diagram form, a wireless telephone for implementing the invention. Overall control of the wireless terminal is provided by control unit 101. Units 102, 103, 106, 107, 108, and 109 provide the RF communication capabilities for the wireless terminal. Units 106 and 103 are connected by link 115. Elements 104, 110, and 111–114 provide the audio information received and transmitted to the user; whereas, elements 116–118 and 105 provide the basic user interface. Memory 119 is used to store data such as voice announcements that control unit 101 transmits to a caller via elements 103 and 104. Speed transceiver 129 is designed to receive information that is used by control unit to calculate the speed at which the wireless terminal is traveling.

When control unit 101 detects that an incoming call is being received via elements 102–108, control unit 101 determines what the speed is by reading the output of speed transceiver 129. Speed transceiver 109 is interconnected to a global positioning satellite (GPS) device. (Control unit 101 is responsive to the changing position information from the GPS device to determine the speed at which the wireless telephone is moving. One skilled in the art can readily see that in the case of a wireless telephone that is designed to be connected to an automobile, that speed transceiver 129 could be receiving information from the speedometer of the automobile. In addition, positioning methods other than a GPS device could be utilized to determine the speed based on change of position. If control unit 101 determines that the speed is above a predefined amount, it does not alert the user of the wireless telephone via audio transducer 117 or vibration transducer 118. Rather, control unit 101 transmits a voice message to the caller defining that the call is not being answered because the user is presently driving. The voice message is initially stored in memory 119 as a digital audio message. Control unit 101 then prompts the caller to leave either a voice message or their telephone number which may be inputted using multi-frequency tones. Control unit 101 does not give the user access to the recorded information until the wireless telephone has ceased to move at a rate in access of the predefined speed. Advantageously, the predefined speed may be 5 mph. In addition, control unit 101 does not allow the user to originate a call if the speed is in excess of the predefined speed.

Further, in order to prevent a user from originating or receiving a telephone call while momentarily stopped, control unit 101 requires that the vehicle be below the predefined speed for a predefined amount of time before a call can be received or originated by the user. Advantageously, the predefined amount of time is 30 seconds.

Figure 2:
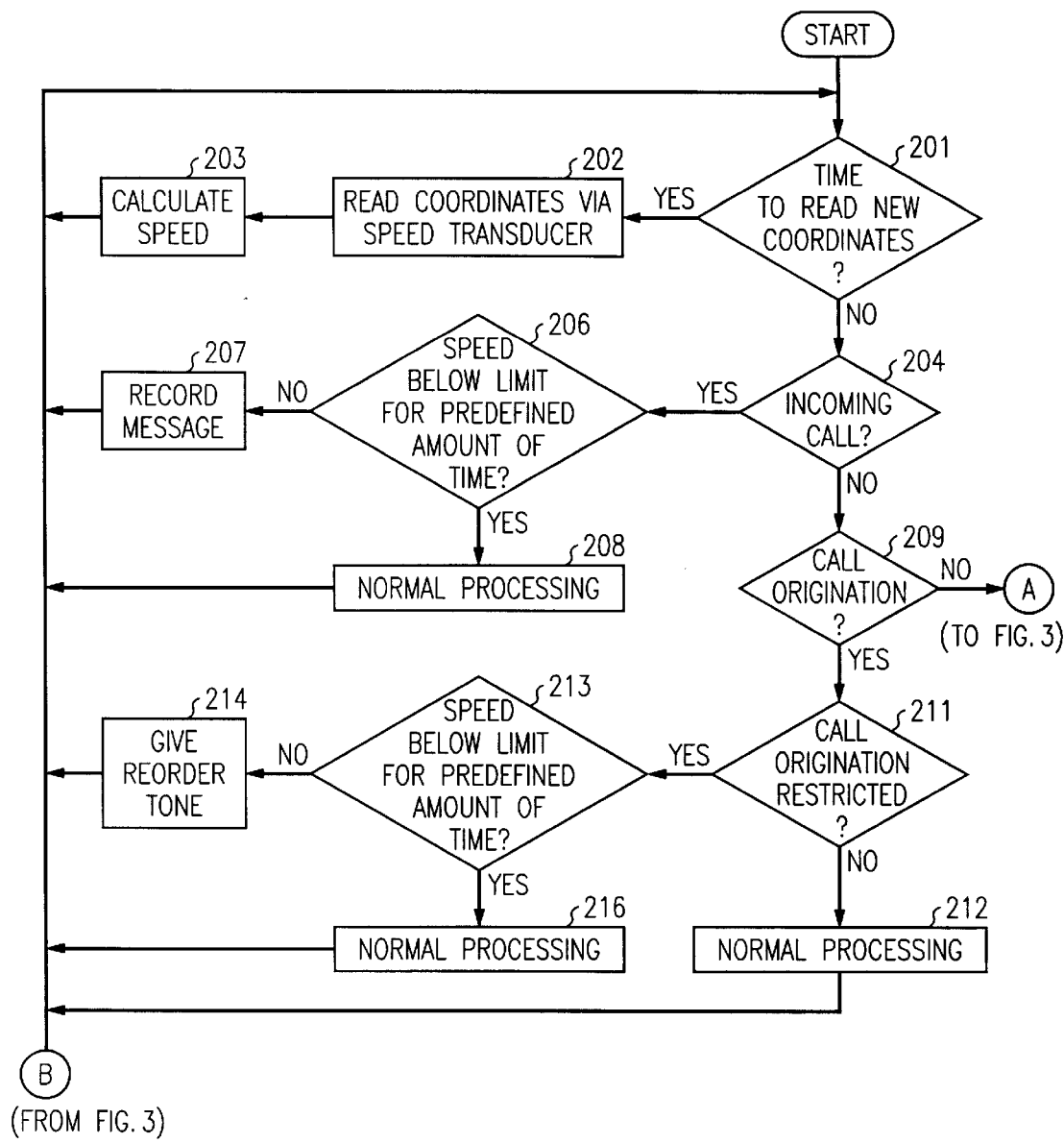
FIGS. 2 and 3 illustrate, in flowchart form, steps performed by a wireless telephone.
Figure 3:
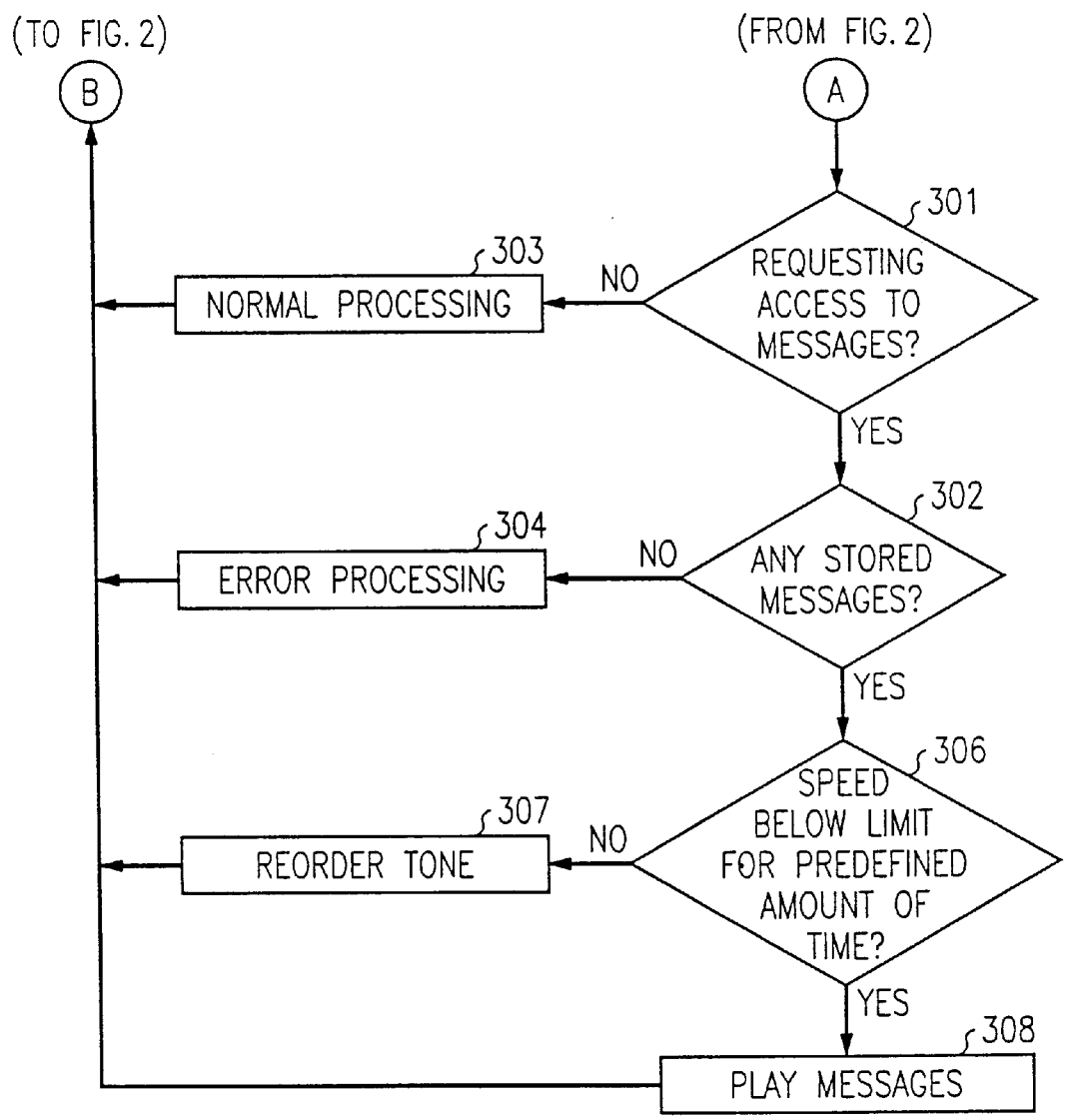

FIGS. 2 and 3 illustrate the steps performed by control unit 101 of the wireless telephone in implementing the invention. Once started, decision block 201 determines if it is time to read new coordinates. These coordinates will be read via speed transducer 129 from GPS device 124 that may be internal or external to the wireless telephone. The coordinates are read at predefined intervals. If the answer is yes in decision block 201, block 202 reads the coordinates via speed transducer 129. Control unit 101 then calculates the present speed by execution of block 203. The calculation of this speed is based on the distance between the old coordinates and the new coordinates. After execution of block 203, control is transferred back to decision block 201.

Returning to decision block 201, if the answer is no, decision 204 determines if an incoming call is being received. If the answer is yes, decision block 206 determines if the present speed is below the limit for a predefined amount of time. If the answer is no, block 207 answers the call and transmits a message to the caller informing them that the wireless telephone cannot accept the message at this time but the caller has the ability to leave a message. If the caller chooses to leave a message, this message is recorded and stored in memory 119 using well known techniques before control is transferred back to decision block 201. If the answer is yes in decision block 206, block 208 performs normal processing for returning control back to decision block 201.

Returning to decision block 204, if a new call is not being received, control is transferred to decision block 209 from decision block 204. Decision block 209 determines if the user of the wireless telephone is attempting to perform a call origination. If the answer is no, control is transferred to decision block 301 of FIG. 3. If the answer is yes in decision block 209, decision block 211 determines if call originations are restricted above the predefined speed. If the answer is no, block 212 performs normal processing before returning control back to decision block 201. If the answer is yes in decision block 211, decision block 213 determines if the speed is below the speed limit for the predefined amount of time. If the answer is no, block 214 gives the user of the wireless telephone reorder tone before returning control back to decision block 201. If the answer in decision block 213 is yes, block 216 performs normal processing before returning control back to decision block 201.

Returning to decision block 209, if the user is not attempting a call origination control is transferred to decision block 301 of FIG. 3. Decision block 301 determines if the user of the wireless telephone is attempting to access stored messages. If the answer is no, block 303 performs normal processing before returning control back to decision block 201 of FIG. 2. If the answer in decision block 301 is yes, decision block 302 determines if there are any stored messages. If the answer is no, block 304 performs error processing before transferring control back to decision block 201 of FIG. 2. If the answer in decision block 302 is yes, decision block 306 determines if the speed has been below the predefined limit for the predefined amount of time. If the answer is no, block 307 gives the user reorder tone for transferring control back to decision block 201 of FIG. 2. If the answer is yes, block 308 plays the messages back to the user from memory 119 using known techniques before transferring control back to decision block 201 of FIG. 2.

Of course, various changes and modifications to the illustrative embodiment described above will be apparent to those skilled in the art. These changes and modifications can be made without departing from the spirit and scope of the invention and without diminishing its attendant advantages. It is therefore intended that such changes and modifications be covered by the following claims.

What is claimed is:

1. A method for controlling a wireless terminal, comprising the steps of:

receiving an incoming call;

detecting a speed of the wireless terminal;

generating an alerting signal for the wireless terminal if the speed is equal or less than a predefined speed;

determining if the detected speed of the wireless terminal has been equal or less than the predefined speed for a predefined time period; and inhibiting the alerting signal if the detected speed had not been equal or less than the predefined speed for the predefined time period;

detecting a call origination actuation on the wireless terminal;

determining if the detected speed of the wireless terminal has been equal or less than the predefined speed for a predefined time period;

processing a call origination for the wireless terminal in response to the call origination actuation if the detected speed has been equal or less than the predefined speed for the predefined time period; and inhibiting the call origination if the detected speed had not been equal or less than the predefined speed for the predefined time period.

2. The method of claim 1 further comprises the step of providing a caller of the incoming call a capability of recording a message upon the detected speed being greater than the predefined speed.

3. The method of claim 2 the step of providing further providing the capability of recording a message upon the detected speed having not been equal or less than the predefined speed for the predefined time period.

* * * * *